United States Patent
Xie (10) Patent No.: US 12,552,024 B2
(45) Date of Patent: Feb. 17, 2026

(54) METHOD AND APPARATUS FOR CONTROLLING ROBOT MOTION, DEVICE AND STORAGE MEDIUM

(71) Applicant: BEIJING XIAOMI ROBOT TECHNOLOGY CO., LTD., Beijing (CN)

(72) Inventor: Yan Xie, Beijing (CN)

(73) Assignee: BEIJING XIAOMI ROBOT TECHNOLOGY CO., LTD., Beijing (CN)

( * ) Notice: Subject to any disclaimer, the term of this patent is extended or adjusted under 35 U.S.C. 154(b) by 206 days.

(21) Appl. No.: 18/373,242

(22) Filed: Sep. 26, 2023

(65) Prior Publication Data

US 2024/0208051 A1 Jun. 27, 2024

(30) Foreign Application Priority Data

Dec. 23, 2022 (CN) .......................... 202211664693.5

(51) Int. Cl.
- *B25J 13/08* (2006.01)
- *B25J 9/16* (2006.01)
- *B62D 57/032* (2006.01)

(52) U.S. Cl.
CPC ........... *B25J 9/1651* (2013.01); *B25J 9/1664* (2013.01); *B25J 13/089* (2013.01); *B62D 57/032* (2013.01)

(58) Field of Classification Search
CPC ...... B25J 9/1651; B25J 9/1664; B25J 13/089; B62D 57/032
See application file for complete search history.

(56) References Cited

U.S. PATENT DOCUMENTS

| | | |
|---|---|---|
| 9,499,218 B1 | 11/2016 | Stephens |
| 2011/0231050 A1* | 9/2011 | Goulding ............. G05D 1/0891 180/8.1 |

(Continued)

OTHER PUBLICATIONS

Guiyang Xin and Songyan Xin and Oguzhan Cebe and Mathew Jose Pollayil and Franco Angelini and Manolo Garabini and Sethu Vijayakumar and Michael Mistry, Robust Footstep Planning and LQR Control for Dynamic Quadrupedal Locomotion, 2021 (Year: 2021).*

(Continued)

*Primary Examiner* — Adam R Mott
*Assistant Examiner* — Heather J Keniry
(74) *Attorney, Agent, or Firm* — Arch & Lake LLP; Hao Tan; Shen Wang (57) ABSTRACT

A method for controlling robot motion includes: determining a remaining duration of a current stepping cycle, which is a duration from a current moment to an end moment of the current stepping cycle; predicting, based on the remaining duration, an expected velocity, a first center of mass position and a first instantaneous velocity of the robot at the current moment, and a state space equation, a second center of mass position and a second instantaneous velocity of the robot at the end moment; determining, based on the expected velocity, the second center of mass position and the second instantaneous velocity, a stable foothold position corresponding to the current stepping cycle; determining, based on the stable foothold position and the second center of mass position, at least one motion parameter corresponding to at least one joint in the robot associated with stepping; and controlling the robot based on the at least one motion parameter.

8 Claims, 5 Drawing Sheets

(56) References Cited

U.S. PATENT DOCUMENTS

2021/0323149 A1* 10/2021 Graber-Tilton ........ B25J 9/1653
2024/0269846 A1* 8/2024 Wang ......................... B25J 9/16

OTHER PUBLICATIONS

Colin Graf et al., "A Center of Mass Observing 3D-LIPM Gait for the RoboCup Standard Platform League Humanoid," Springer-Verlag Berlin Heidelberg, SAT 2015 18th International Conference, Austin, TX, USA, XP047292397, Sep. 24-27, 2015, (12p).

Chenglong Fu: "Perturbation recovery of biped walking by updating the footstep," IEEE, 2014 IEEE/SRJ International Conference on Intelligent Robots and Systems (IROS 2014), Chicago, IL, USA, Sep. 14-18, 2014, (6p).

Sheng Dong et al., "On-Line Gait Adjustment for Humanoid RobotRobust Walking Based on Divergence Component of Motion," IEEE Access vol. 7, XP011754108, Oct. 28, 2019, (12p).

Extended European Search Report issued in Application No. 23207089.6 dated Apr. 23, 2024, (10p).

\* cited by examiner

METHOD AND APPARATUS FOR CONTROLLING ROBOT MOTION, DEVICE AND STORAGE MEDIUM

CROSS-REFERENCE

The present application is based upon and claims the benefit of priority to Chinese Patent Application No. 202211664693.5, filed on Dec. 23, 2022, the entire contents of which are incorporated herein by reference for all purposes.

TECHNICAL FIELD

The present disclosure relates to the field of robot motion control technologies, and in particular, to a method and apparatus for controlling robot motion, a device and a storage medium.

BACKGROUND

With the advancement of science and technologies, robots, such as bipedal upright robots, have been widely used in production and life.

During robot motion, a stepping cycle and a step length of a robot are typically constant. A foothold of the robot at an end moment of each stepping cycle is only related to the step length. Moreover, a relative position between a swing leg and a torso of the robot is constant.

When the robot is subjected to an external force, a center of mass position of the robot will change.

SUMMARY

Embodiments of the present disclosure provide a method and apparatus for controlling robot motion, a device and a storage medium.

In a first aspect, the present disclosure provides a method for controlling robot motion, and the method includes:
  determining a remaining duration of a current stepping cycle, where the remaining duration is a duration from a current moment to an end moment of the current stepping cycle;
  predicting, based on the remaining duration, an expected velocity of a robot, a first center of mass position and a first instantaneous velocity of the robot at the current moment, and a state space equation, a second center of mass position and a second instantaneous velocity of the robot at the end moment of the current stepping cycle;
  determining, based on the expected velocity, the second center of mass position and the second instantaneous velocity, a stable foothold position corresponding to the current stepping cycle;
  determining, based on the stable foothold position and the second center of mass position, at least one motion parameter corresponding to at least one joint in the robot associated with stepping; and
  controlling the robot based on the at least one motion parameter.

In a second aspect, there is provided an electronic device, including a processor and a memory. At least one instruction is stored in the memory, which is loaded and executed by the processor to implement operations performed by the method for controlling the robot motion.

In a third aspect, there is provided a computer-readable storage medium. At least one instruction is stored in the storage medium, which is loaded and executed by the processor to implement operations performed by the method for controlling the robot motion.

It should be noted that the above general description and the following detailed description are merely exemplary and explanatory and should not be construed as limiting of the disclosure.

BRIEF DESCRIPTION OF THE DRAWINGS

In order to explain technical solutions in embodiments of the present disclosure more clearly, drawings needed in the description of these embodiments will be briefly introduced below. Obviously, the drawings in the following description are only some embodiments of the present disclosure. For those of ordinary skill in the art, other drawings may be obtained from these drawings without creative labor.

DETAILED DESCRIPTION

The technical or scientific terminologies used herein shall, unless otherwise defined, have the ordinary meanings as understood by persons of ordinary skill in the art to which the present disclosure relates. Terms such as "first", "second", "third" and the like used in the description and claims of the present disclosure do not indicate any order, quantity or importance, but are only used to distinguish different components. Likewise, similar words such as "a/an" or "one" do not mean a quantity limit, but rather the existence of at least one. Similar terms such as "include" or "contain" are intended to indicate that an element or an object that appears before the "include" or "contain" cover an element or an object and equivalents that appears after the "include" or "contain", without excluding other elements or objects. Similar words such as "connected to" or "connected with" are not limited to physical or mechanical connections, but may include electrical connections, whether direct or indirect. The terms "up", "down", "left", "right", etc. are only used to indicate relative position relationships, and when an absolute position of the described object changes, the relative position relationship may also change accordingly.

In order to make the objectives, technical solutions and advantages of the present disclosure clearer, implementations of the present disclosure will be further described in detail in combination with the drawings.

It is inevitable for a robot to be affected by an external force during motion, such as a push from a back of the robot, a push from a side of the robot, or the like. When the robot is subjected to the external force, a center of mass (also called a center of gravity) of the robot will change. At present, when the robot takes a step, a relative position between a swing leg and a torso of the robot is constant, which means that the robot's stepping cycle and step length of each step are constant. When the robot is subjected to the external force, the relative position between the swing leg and the torso of the robot will not be adjusted with the change in the center of mass position. That is to say, when the robot is taking the step and is subjected to the external force, the step length of each step is still the same as the step length of each step when the robot is not subjected to the external force, which makes the force on the robot unbalanced, causing the robot to fall. As seen, the stability of the robot during the motion is poor in the related arts.

Embodiments of the present disclosure provide a method for controlling robot motion. When a center of mass position and an instantaneous velocity of the robot change due to the external force on the robot during the motion, the robot will adjust a foothold according to the center of mass position and the instantaneous velocity, thereby improving the stability of the robot during the motion. The method may be applied to the motion control of a bipedal upright robot, or may also be applied to the motion control of a quadrupedal crawling robot (also called a legged robot). Regarding application scenarios of the method, this is only an illustrative description, rather than a limitation.

In the following, taking the robot as the bipedal upright robot as an example, the method for controlling the robot motion provided by embodiments of the present disclosure will be described. A case that the method is applied to another type of robot (such as the quadrupedal robot) is the same as or similar to a case that the method is applied to the bipedal upright robot, which will not be described in details in embodiments of the present disclosure.

The bipedal upright robot has two legs with each leg having a plurality of kinematic joints, such as a joint at an ankle (at a junction of a calf and a foot), a joint at a knee (at a junction of the calf and a thigh), and so on, and each kinematic joint is controlled by a motor. During the motion, a controller in the robot controls the motion of the robot by controlling the operation of the motor to control the kinematic joint to make adjustments.

When the bipedal upright robot takes a step, one leg plays a support role, which is called a support leg, and the other leg is lifted and swings forward, which is called a swing leg. A process from the lifting to the landing of the swing leg is called a stepping cycle, that is, when the swing leg lands on the ground, the stepping cycle ends. In the next stepping cycle, the swing leg is switched as the support leg, the support leg is switched as the swing leg, and so on, so as to realize the motion.

Embodiments of the present disclosure provide a method for controlling robot motion, and an execution subject of the method may be the controller in the robot (hereinafter referred to as the controller).

Figure 1:
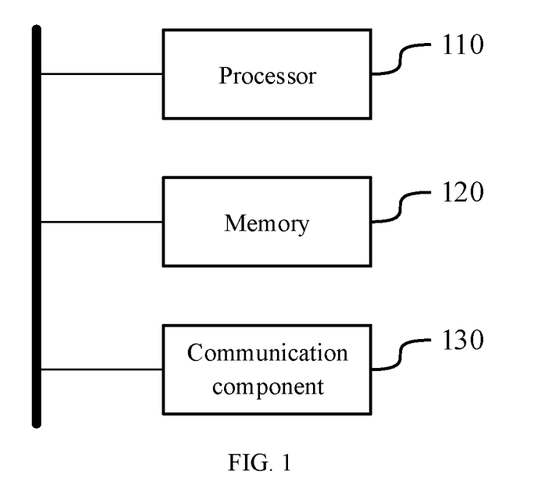
FIG. 1 is a schematic structural diagram of a controller according to an embodiment of the present disclosure.

FIG. 1 is a schematic structural diagram of a controller according to an embodiment of the present disclosure. As an example, from the perspective of hardware composition, a structure of the controller may be as shown in FIG. 1, which includes a processor 110, a memory 120 and a communication component 130.

The processor 110 may be a Central Processing Unit (CPU), a System on Chip (SoC), or the like. The processor 110 may be configured to determine a remaining duration of a current stepping cycle, so as to predict a second center of mass position and a second instantaneous velocity of the robot, to determine a stable foothold position corresponding to the current stepping cycle, and so on.

The memory 120 may be various volatile memories or non-volatile memories, such as a Solid State Disk (SSD), a Dynamic Random Access Memory (DRAM), etc. The memory 120 may be configured to store pre-stored data, intermediate data and result data in the process of controlling the robot motion, such as, a duration of a stepping cycle, a first center of mass position, a first instantaneous velocity, a state space equation, etc.

The communication component 130 may be a wired network connector, a Wireless Fidelity (WiFi) module, a Bluetooth module, a cellular network communication module, etc. The communication component 130 may be configured to transmit data with other devices, which may be a remote controller of the robot, an operating terminal, or the motor corresponding to each kinematic joint, etc.

Figure 2:
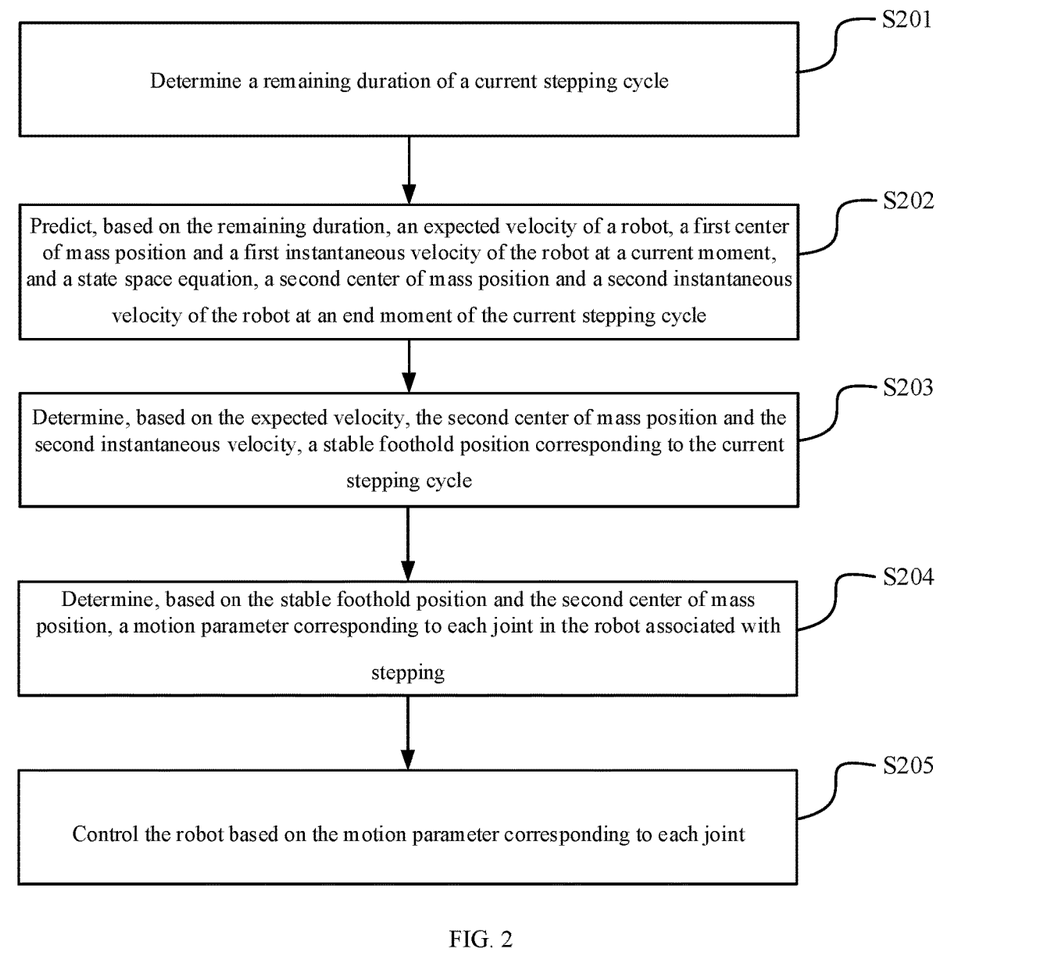
FIG. 2 is a flowchart of a method for controlling robot motion according to an embodiment of the present disclosure.
Figure 3:
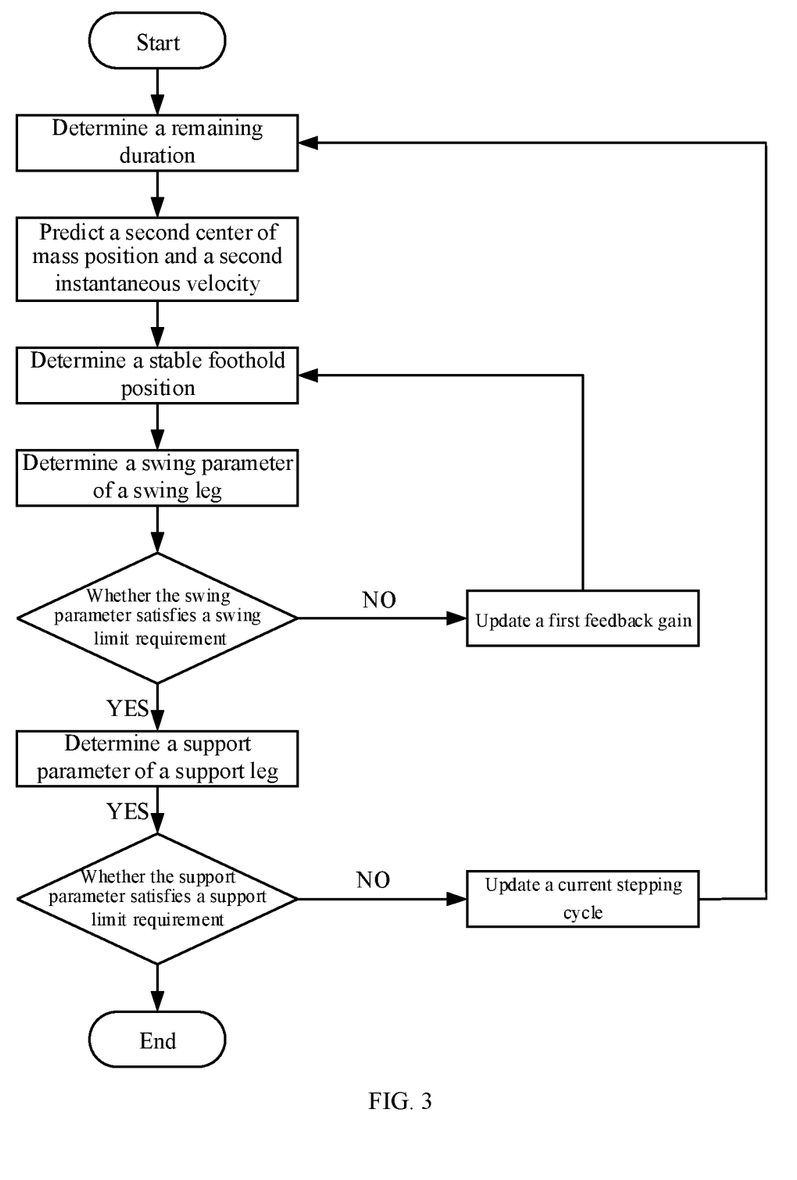
FIG. 3 is a flowchart of a method for controlling robot motion according to an embodiment of the present disclosure.

FIG. 2 is a flowchart of a method for controlling robot motion according to an embodiment of the present disclosure, and FIG. 3 is a flowchart of a method for controlling robot motion according to an embodiment of the present disclosure. As shown in FIGS. 2 and 3, the method for controlling the robot motion includes the following processing steps S201 to S205.

In the S201, a remaining duration of a current stepping cycle is determined.

The remaining duration is a duration from a current moment to an end moment of the current stepping cycle.

In each stepping cycle during the robot motion, the controller will determine the stable foothold position of the robot at the end of the stepping cycle at a specified time interval, and the time interval is much shorter than the duration of the robot's stepping cycle. For example, the stepping cycle is 0.5 seconds, and the time interval is 0.005 seconds, etc. Therefore, it may also be considered that the controller determines the stable foothold position at the end of the stepping cycle in real time.

The duration of the stepping cycle of the robot is preset in the controller. Before determining the stable foothold position, the controller needs to first determine the remaining duration from the current moment to the end moment of the current stepping cycle. For example, the duration of the stepping cycle is 0.5 seconds, and the current moment is the 0.2 second of the stepping cycle, then the remaining duration of the current stepping cycle is 0.3 seconds, and so on.

In the S202, based on the remaining duration, an expected velocity of a robot, a first center of mass position and a first instantaneous velocity of the robot at the current moment, and a state space equation, a second center of mass position and a second instantaneous velocity of the robot at the end moment of the current stepping cycle are predicted.

The controller can obtain the expected velocity of the robot, the first center of mass position and the first instantaneous velocity of the robot at the current moment, and the state space equation is pre-stored in the controller. The expected velocity of the robot may be preset by a user through a terminal device or a remote control device. For example, the user sets the expected velocity (which may also be considered as an average velocity) of the robot during the motion through the remote control device as 1 meter/second, etc. The first center of mass position and the first instantaneous velocity of the robot at the current moment may be estimated by the controller in combination with a motion state of each kinematic joint at the current moment and a forward kinematics solution algorithm, or may be detected by setting up a sensor. The state space equation is shown as formula (1):

$$\begin{bmatrix} x(T) \\ v(T) \end{bmatrix} = \begin{bmatrix} \cosh(\lambda(T_1 - t)) & \frac{\sinh(\lambda(T_1 - t))}{\lambda} \\ \lambda\sinh(\lambda(T_1 - t)) & \cosh(\lambda(T_1 - t)) \end{bmatrix} \begin{bmatrix} x(t) \\ v(t) \end{bmatrix}, \lambda = \sqrt{g/H} \quad (1)$$

where, x(T) represents a center of mass position at the end moment of the current stepping cycle, v(T) represents an instantaneous velocity at the end moment of the current stepping cycle, x(t), represents a center of mass position at time t (i.e., the current moment) in the current stepping cycle, v(t) represents an instantaneous velocity at time t (i.e., the current moment) in the current stepping cycle, $T_1$ represents a duration of the current stepping cycle, ($T_1$−t) represents the remaining duration of the current stepping cycle, H represents a height of the center of mass (it is usually assumed that the height of the center of mass of the robot remains unchanged during the motion), and g represents an acceleration of gravity.

A process of the controller predicting the second center of mass position and the second instantaneous velocity of the robot at the end moment of the current stepping cycle is as follows.

First, the controller obtains an expression of an instantaneous velocity at the end moment of the stepping cycle by transforming the above state space equation, as shown in formula (2):

$$v(T) = \lambda\sinh(\lambda(T_1 - t))x(t) + \cosh(\lambda(T_1 - t))v(t) \quad (2)$$

Secondly, the controller inputs the remaining duration ($T_1$−t), the first center of mass position x(t) and the first instantaneous velocity v(t) of the robot at the current moment into the formula (2), so as to predict the second instantaneous velocity v(T) of the robot at the end moment of the current stepping cycle.

Then, the controller obtain an expression of a center of mass position at the end moment of the stepping cycle by transforming the above state space equation, as shown in formula (3):

$$x(T) = \frac{v^{ref}(T) - \cosh(\lambda T_1)v(T)}{\lambda\sinh(\lambda T_1)} \quad (3)$$

where, $v^{ref}$(T) represents the expected velocity of the robot.

Finally, the controller inputs the expected velocity $v^{ref}$(T) of the robot, the second instantaneous velocity v(T), and the duration $T_1$ of the current stepping cycle into the formula (3), so as to predict the second center of mass position x(T) of the robot at the end moment of the current stepping cycle.

In the S203, a stable foothold position corresponding to the current stepping cycle is determined based on the expected velocity, the second center of mass position and the second instantaneous velocity.

Before determining the stable foothold position, the controller needs to first determine a first feedforward coefficient and a first feedback gain for the instantaneous velocity of the center of mass at the end moment of the current stepping cycle. A calculation formula for the first feedforward coefficient is as shown in formula (4), and a calculation formula for the first feedback gain is as shown in formula (5):

$$\frac{1}{\sigma} = \frac{1}{\lambda\coth(\lambda T_1/2)} \quad (4)$$

$$k^* = \frac{1}{\lambda\sinh(\lambda T_1)} \quad (5)$$

where 1/σ represents the first feedforward coefficient for the instantaneous where velocity of the center of mass at the end moment of the current stepping cycle, and k* represents the first feedback gain for the instantaneous velocity of the center of mass at the end moment of the current stepping cycle.

From the motion state analysis of the robot during the motion, it may be considered that the center of mass position of the robot at the end moment of the current stepping cycle is the same as a center of mass position of the robot at a start moment of the next stepping cycle. Therefore, the stable foothold position $x_1$ of the robot at the end moment of the current stepping cycle may be determined based on the expected velocity, the second instantaneous velocity and the following formula (6). Specifically, the stable foothold position represents a distance between the stable foothold point and the second center of mass position.

$$x_1 = \frac{1}{\sigma}v(T) + k^*\left(v(T) - x^{ref}(T)\right) \quad (6)$$

In the S204, based on the stable foothold position and the second center of mass position, at least one motion parameter corresponding to at least one joint in the robot associated with the stepping is determined.

After determining the stable foothold position of the robot, the controller may determine the at least one motion parameter corresponding to the at least one joint associated with the stepping in the robot. As an example, the controller may determine a swing angle of each swing joint in the swing leg of the robot and a support angle of each support joint in the support leg of the robot. In some embodiments of the present disclosure, the controller may further determine at least one motion parameter of at least one joint in an arm, at least one motion parameter of at least one joint in the torso, and so on. Moreover, the at least one motion parameter may be, but not limited to, the swing angle and the support angle mentioned above, which is not limited herein.

Figure 4:
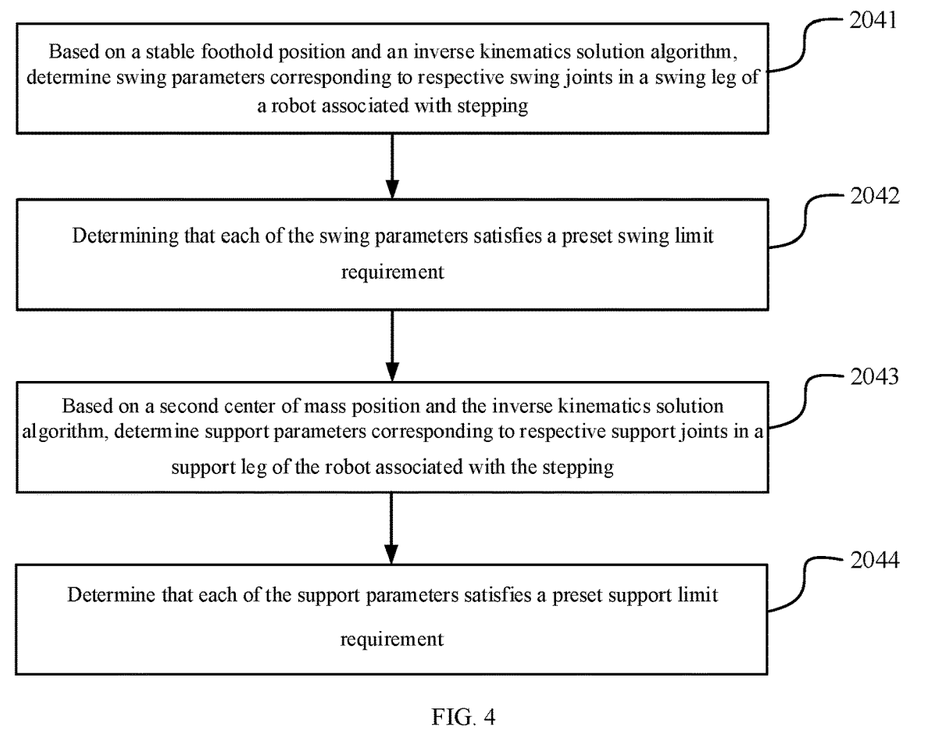
FIG. 4 is a flowchart of a method for determining a motion parameter in a robot according to an embodiment of the present disclosure.

FIG. 4 is a flowchart of a method for determining a motion parameter in a robot according to an embodiment of the present disclosure. Referring to FIGS. 3 and 4, determining the motion parameter may include the following processes.

In 2041, based on the stable foothold position and an inverse kinematics solution algorithm, swing parameters corresponding to respective swing joints in a swing leg of the robot associated with the stepping are determined.

When the robot moves along a straight line, it is assumed that a coordinate system is established by taking the foothold point of the support leg as a coordinate origin, a forward direction as the X direction, an opposite direction of gravity as the Z direction and a direction perpendicular to the forward direction and the opposite direction of gravity as the Y direction, and the second center of mass position (that is, coordinates of the center of mass in this coordinate system) and the stable foothold position (that is, coordinates of the stable foothold in this coordinate system) of the robot in this coordinate system may be determined, then a space vector from the second center of mass position to the stable foothold position may be determined according to the second center of mass position and the stable foothold position, and the space vector may be expressed by $x_{CoM \to sw}$.

The controller may determine the swing parameter $q_{sw} = IK(x_{CoM \to sw})$ corresponding to each swing joint associated with the stepping in the swing leg of the robot in combination with the above-mentioned space vector $x_{CoM \to sw}$ and the inverse kinematics solution algorithm, where IK( ) represents the inverse kinematics solution algorithm, and the inverse kinematics solution algorithm may be a machine learning model or a mathematical formula, which is not limited here.

For example, the swing leg includes three swing joints of an ankle joint, a knee joint and a hip joint associated with the stepping. In order to make the swing leg reach the stable foothold position, a swing angle (that is, the swing parameter) of the ankle joint should be 30 degrees, a swing angle of the knee joint should be 120 degrees, a swing angle of the hip joint should be 110 degrees, and so on.

In 2042, it is determined that each swing parameter satisfies a preset swing limit requirement.

The controller pre-stores the swing limit requirement corresponding to each swing joint associated with the stepping in the swing leg. For example, the swing leg includes three swing joints of the ankle joint, the knee joint and the hip joint associated with the stepping, a swing limit requirement of the ankle joint is that the maximum swing angle does not exceed 45 degrees, a swing limit requirement of the knee joint is that the maximum swing angle does not exceed 180 degrees, a swing limit requirement of the hip joint is that the maximum swing angle does not exceed 90 degrees, and so on. This is only an illustrative description of the swing limit requirement here, rather than a limitation.

Next, the controller needs to determine whether the swing parameter corresponding to each swing joint satisfies the preset swing limit requirement. If the swing parameter corresponding to each swing joint satisfies the preset swing limit requirement corresponding to each swing joint, the next processing is performed. If a first swing parameter corresponding to a first swing joint among the respective swing joints does not satisfy a first swing limit requirement corresponding to the first swing joint, the first feedback gain needs to be updated, to re-determine the stable foothold position, that is, the step S203 is turned to be executed.

For example, in order to make the swing leg reach the stable foothold position, the swing angle of the ankle joint should be 30 degrees, the swing angle of the knee joint should be 120 degrees, and the swing angle of the hip joint should be 110 degrees. The swing angle of the hip joint significantly exceeds the swing limit requirement of the hip joint (that is, the swing angle does not exceed 90 degrees), and in this case, the first feedback gain needs to be updated for recalculation.

Embodiments of the present disclosure provide the following two manners of updating the first feedback gain.

Manner 1

A first feedback gain update coefficient is pre-stored in the controller, which is typically greater than 0 and less than 1. When determining that the first feedback gain needs to be updated, the controller may calculate a product of the first feedback gain and the first feedback gain update coefficient, and determine this product as a new first feedback gain. Then, based on the new first feedback gain, the controller may determine a new stable foothold position according to the step S203 again. Next, the swing parameter corresponding to each swing joint associated with the stepping in the swing leg of the robot is determined again according to the step 2041. Then, it is determined again whether the swing parameter corresponding to each swing joint associated with the stepping satisfies the preset swing limit requirement, and so on, until the swing parameters corresponding to the respective swing joints associated with the stepping satisfy the preset swing limit requirements, respectively.

Manner 2

A feedback gain set, that is, a plurality of feedback gains, is pre-stored in the controller, and the feedback gain set may be established by a researcher based on experience. When determining that the first feedback gain needs to be updated, the controller may first determine in the pre-stored feedback gain set a subset of feedback gains smaller than the first feedback gain. Then, the controller may determine the largest feedback gain in the subset of feedback gains as a second feedback gain. Next, the controller may update the first feedback gain as the second feedback gain. Finally, the controller turns to the step S203, and so on, until the swing parameters corresponding to the respective swing joints associated with the stepping satisfy the preset swing limit requirements, respectively.

In 2043, based on the second center of mass position and the inverse kinematics solution algorithm, support parameters corresponding to respective support joints in the support leg of the robot associated with the stepping are determined.

After determining that the support parameters of the respective support joints associated with the stepping in the support leg satisfy the preset support limit requirements, respectively, the controller will determine a space vector between the foothold point of the support leg and the second center of mass position according to the second center of mass position and the foothold point of the support leg (that is, the above-mentioned coordinate origin), and the space vector may be expressed as $x_{st \to CoM}$. Then, according to the space vector $x_{st \to CoM}$ and the inverse kinematics solution algorithm, the controller determines the support parameter $q_{st} = IK(x_{st \to CoM})$ corresponding to each support joint associated with the stepping in the support leg of the robot.

For example, the support leg also includes three support joints of the ankle joint, the knee joint and the hip joint associated with the stepping. In order to make the support leg reach the stable foothold position, a support angle (that is, the support parameter) of the ankle joint should be −60 degrees, a support angle of the knee joint should be −110 degrees, a support angle of the hip joint should be −45 degrees, and so on.

In 2044, it is determined that each support parameter satisfies a preset support limit requirement.

The controller pre-stores the support limit requirement corresponding to each support joint associated with the stepping in the support leg. For example, the support leg includes three support joints of the ankle joint, the knee joint and the hip joint associated with the stepping, a support limit requirement of the ankle joint is that the maximum support angle does not exceed −45 degrees, a support limit requirement of the knee joint is that the maximum support angle does not exceed −180 degrees, a support limit requirement of the hip joint is that the maximum support angle does not exceed −90 degrees, and so on. This is only an illustrative description of the support limit requirement here, rather than a limitation.

Next, the controller needs to determine whether the support parameter corresponding to each support joint satisfies the preset support limit requirement. If the support parameters corresponding to the respective support joints satisfy the preset support limit requirements corresponding to the respective support joints, respectively, the next processing is performed. If a first support parameter corresponding to a first support joint among the respective support joints does not satisfy a first support limit requirement corresponding to the first support joint, the current stepping cycle needs to be updated for recalculation. Specifically, a duration of the current stepping cycle needs to be updated.

For example, in order to make the support leg reach the stable foothold position, the support angle of the ankle joint should be −60 degrees, the support angle of the knee joint should be −110 degrees, and the support angle of the hip joint should be −45 degrees. The support angle of the ankle joint significantly exceeds the support limit requirement of the ankle joint (that is, the support angle does not exceed −45 degrees), and in this case, the current stepping cycle needs to be updated for recalculation.

Embodiments of the present disclosure provide the following two manners of updating the current stepping cycle.

Manner 1

A stepping cycle update coefficient is pre-stored in the controller, which is typically greater than 0 and less than 1. When determining that the current stepping cycle needs to be updated, the controller may calculate a product of the duration of the current stepping cycle and the stepping cycle update coefficient, and determine this product as a new duration of the current stepping cycle. Then, based on the new duration of the current stepping cycle, the controller may determine a new remaining duration according to the step S201, and then sequentially perform the above steps S202, S203, 2041, 2042 and 2043. After the end of the step 2043, the controller may determine again whether the support parameter corresponding to each support joint satisfies the preset support limit requirement, and so on, until the support parameters corresponding to the respective support joints associated with the stepping satisfy the preset support limit requirements, respectively.

In some embodiments of the present disclosure, in a case that the executed is done according to the new duration of the current stepping cycle, if it is found, when the step 2042 is executed, that the first swing parameter corresponding to the first swing joint among the respective swing joints does not satisfy the first swing limit requirement corresponding to the first swing joint, the first feedback gain needs to be updated for recalculation, and the step 2043 is no longer executed. The step 2043 is executed only when the execution is done according to the new duration of the current stepping cycle, and the swing parameters corresponding to the respective swing joints satisfy the preset swing limit requirements corresponding to the respective swing joints, respectively.

Manner 2

A stepping cycle set, that is, durations corresponding to a plurality of stepping cycles, is pre-stored in the controller, and the stepping cycle set may be established by the researcher based on experience. When the controller determines that the current stepping cycle needs to be updated, the controller may first determine a subset of stepping cycles whose duration is shorter than that of the current stepping cycle in the pre-stored stepping cycle set. Then, the controller may determine a stepping cycle with the largest duration in the subset of stepping cycles as a replacement stepping cycle. Next, the controller may update the duration of the current stepping cycle as the duration of the replacement stepping cycle. Finally, the controller may turn to the step S201, and so on, until the support parameters corresponding to the respective support joints associated with the stepping satisfy the preset support limit requirements, respectively.

In the S205, the robot is controlled based on the at least one motion parameter.

Finally, the controller controls the robot based on the swing parameter that satisfies the swing limit condition and the support parameter that satisfies the support limit condition. Specifically, the controller may control the motor corresponding to at least one joint to operate, so that the at least one joint reaches the corresponding at least one motion parameter to achieve the smooth motion of the robot.

In the solutions provided by embodiments of the present disclosure, in the process of controlling the robot motion, the second center of mass position and the second instantaneous velocity of the robot may be predicted based on the first center of mass position and the first instantaneous velocity of the robot at the current moment and the state space equation, and then the stable foothold of the robot is determined. By means of the solutions, the center of mass position and the center of mass velocity ((i.e., the instantaneous velocity) of the robot are taken into account upon the determination of the stable foothold of the robot. If the center of mass position and the center of mass velocity of the robot change due to the external force during the motion, the robot will determine the stable foothold based on the changed center of mass position and center of mass velocity, so that legs of the robot have balanced force when the legs of the robot reach the stable foothold, preventing the robot from falling, which facilitates to improve the stability of the robot during the motion.

Figure 5:
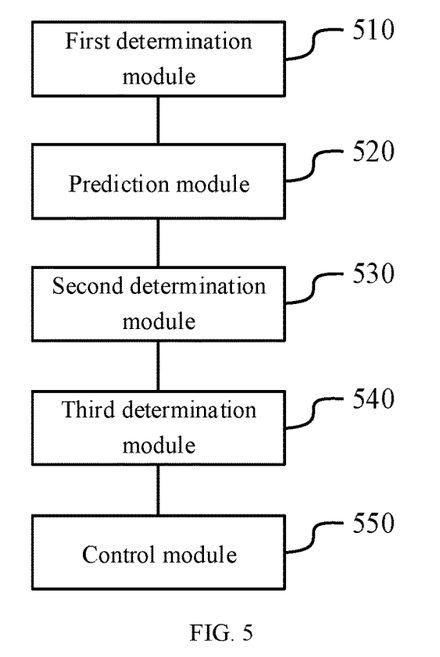
FIG. 5 is a schematic structural diagram of an apparatus for controlling robot motion according to an embodiment of the present disclosure.

The present disclosure provides an apparatus for controlling robot motion. FIG. 5 is a schematic structural diagram of an apparatus for controlling robot motion according to an embodiment of the present disclosure, and as shown in FIG. 5, the apparatus includes:

a first determination module 510, configured to determine a remaining duration of a current stepping cycle, where the remaining duration is a duration from a current moment to an end moment of the current stepping cycle;

a prediction module 520, configured to predict, based on the remaining duration, an expected velocity of a robot, a first center of mass position and a first instantaneous velocity of the robot at the current moment, and a state space equation, a second center of mass position and a second instantaneous velocity of the robot at the end moment;

a second determination module 530, configured to determine, based on the expected velocity, the second center of mass position and the second instantaneous velocity, a stable foothold position corresponding to the current stepping cycle;

a third determination module 540, configured to determine, based on the stable foothold position and the second center of mass position, at least one motion parameter corresponding to at least one joint in the robot associated with stepping; and a control module 550, configured to control the robot based on the at least one motion parameter.

In some embodiments of the present disclosure, the second determination module 530 is configured to:

determine a first feedforward coefficient and a first feedback gain based on a duration of the current stepping cycle; and determine, based on the expected velocity, the second instantaneous velocity, the first feedforward coefficient and the first feedback gain, the stable foothold position corresponding to the current stepping cycle.

In some embodiments of the present disclosure, the third determination module 540 is configured to:
- based on the stable foothold position and an inverse kinematics solution algorithm, determine swing parameters corresponding to respective swing joints in a swing leg of the robot associated with the stepping, and determine whether the swing parameters satisfy a preset swing limit requirement; and
- based on the second center of mass position and the inverse kinematics solution algorithm, determine support parameters corresponding to respective support joints in a support leg of the robot associated with the stepping, and determine whether the support parameters satisfy a preset support limit requirement.

In some embodiments of the present disclosure, the third determination module 540 is configured to:
- in response to that a first swing parameter corresponding to a first swing joint among the respective swing joints does not satisfy a first swing limit requirement corresponding to the first swing joint, update the first feedback gain; and
- turn to performing that determining, based on the expected velocity, the second instantaneous velocity, the first feedforward coefficient and the first feedback gain, the stable foothold position corresponding to the current stepping cycle, until the swing parameters satisfy the preset swing limit requirement.

In some embodiments of the present disclosure, the third determination module 540 is configured to:
- determine in a pre-stored feedback gain set a subset of feedback gains smaller than the first feedback gain, and determine a largest feedback gain in the subset of feedback gains as a second feedback gain; and update the first feedback gain as the second feedback gain.

In some embodiments of the present disclosure, the third determination module 540 is configured to:
- in response to that a first support parameter corresponding to a first support joint among the respective support joints does not satisfy a first support limit requirement corresponding to the first support joint, update the duration of the current stepping cycle; and
- turn to performing that determining the remaining duration of the current stepping cycle, until the support parameters satisfy the preset support limit requirement.

In some embodiments of the present disclosure, the third determination module 540 is configured to:
- determine in a pre-stored stepping cycle set a subset of stepping cycles whose duration is smaller than the duration of the current stepping cycle, and determine a stepping cycle with a largest duration in the subset of stepping cycles as a replacement stepping cycle; and update the current stepping cycle as the replacement stepping cycle.

In some embodiments of the present disclosure, the prediction module 520 is configured to:
- predict, based on the remaining duration, the first center of mass position and the first instantaneous velocity of the robot at the current moment, and the state space equation, the second instantaneous velocity of the robot at the end moment of the current stepping cycle; and
- predict, based on the expected velocity of the robot, the second instantaneous velocity and the state space equation, the second center of mass position of the robot at the end moment of the current stepping cycle In the solutions provided by embodiments of the present disclosure, in the process of controlling the robot motion, the second center of mass position and the second instantaneous velocity of the robot may be predicted based on the first center of mass position and the first instantaneous velocity of the robot at the current moment and the state space equation, and then the stable foothold of the robot is determined. By means of the solutions, the center of mass position and the center of mass velocity ((i.e., the instantaneous velocity) of the robot are taken into account upon the determination of the stable foothold of the robot. If the center of mass position and the center of mass velocity of the robot change due to the external force during the motion, the robot will determine the stable foothold based on the changed center of mass position and center of mass velocity, so that legs of the robot have balanced force when the legs of the robot reach the stable foothold, preventing the robot from falling, which facilitates to improve the stability of the robot during the motion.

It should be noted that when the motor controller provided in the above embodiments controls the operation of the motor, it is only exemplified and explained by the division of the above functional modules. In practical applications, the above functions may be allocated to be performed by different functional modules according to the actual needs, that is, the internal structure of the apparatus is divided into different functional modules to complete all or part of the functions described above. In addition, the motor controller provided by the above embodiments and the embodiments of the method for controlling the operation of the motor belong to the same idea, and its specific implementation process is detailed in the method embodiments, and will not be repeated here.

Figure 6:
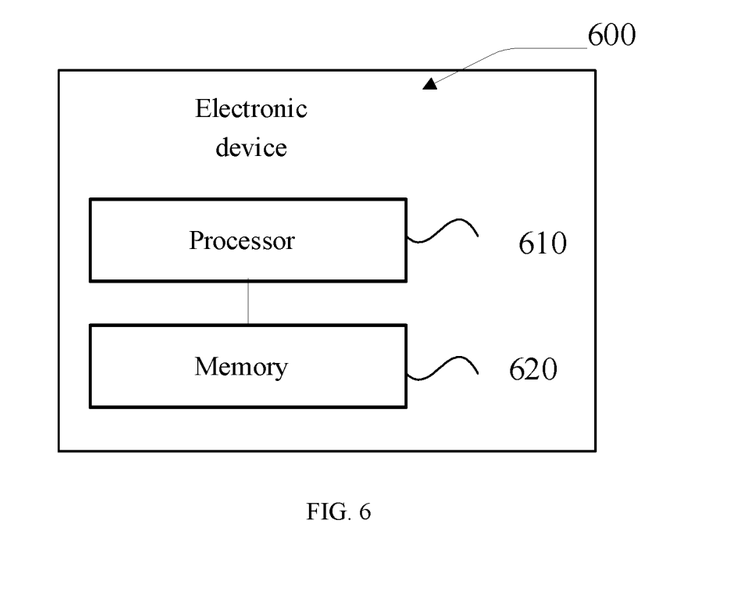
FIG. 6 is a schematic structural diagram of an electronic device according to an embodiment of the present disclosure.

Embodiments of the present disclosure provide an electronic device, and the electronic device includes a robot, which may specifically include a bionic robot. The electronic device may include the above-mentioned controller. FIG. 6 is a schematic structural diagram of an electronic device according to an embodiment of the present disclosure. The electronic device 600 may vary greatly due to different configurations or performances, and may include one or more processor (e.g., CPUs) 610 and one or more memories 620. At least one instruction is stored in the memory 620, and the at least one instruction is loaded and executed by the processor 610 to implement the method provided by each of the above methods. Note that, the electronic device may further have components for inputting and outputting such as a wired or wireless network interface, a keyboard and an input and output interface. The electronic device may further include other components for implementing device functions, which will not be repeated here.

In embodiments of the present disclosure, there is further provided a computer-readable storage medium, such as a memory including instructions, which may be executed by a processor in a terminal to implement the method for controlling the robot motion in the above-mentioned embodiments. The computer-readable storage medium may be non-transitory. For example, the computer-readable storage medium may be a Read-Only Memory (ROM), a Random Access Memory (RAM), a CD-ROM, a magnetic tape, a floppy disk, an optical data storage device, and the like.

In a first aspect, the present disclosure provides a method for controlling robot motion, and the method includes:
- determining a remaining duration of a current stepping cycle, where the remaining duration is a duration from a current moment to an end moment of the current stepping cycle;
- predicting, based on the remaining duration, an expected velocity of a robot, a first center of mass position and a first instantaneous velocity of the robot at the current moment, and a state space equation, a second center of mass position and a second instantaneous velocity of the robot at the end moment of the current stepping cycle;

determining, based on the expected velocity, the second center of mass position and the second instantaneous velocity, a stable foothold position corresponding to the current stepping cycle;

determining, based on the stable foothold position and the second center of mass position, at least one motion parameter corresponding to at least one joint in the robot associated with stepping; and controlling the robot based on the at least one motion parameter.

In some embodiments of the present disclosure, the determining, based on the expected velocity, the second center of mass position and the second instantaneous velocity, the stable foothold position corresponding to the current stepping cycle includes:

determining a first feedforward coefficient and a first feedback gain based on a duration of the current stepping cycle; and determining, based on the expected velocity, the second instantaneous velocity, the first feedforward coefficient and the first feedback gain, the stable foothold position corresponding to the current stepping cycle.

In some embodiments of the present disclosure, the determining, based on the stable foothold position and the second center of mass position, the at least one motion parameter corresponding to at least one joint in the robot associated with the stepping includes:

based on the stable foothold position and an inverse kinematics solution algorithm, determining swing parameters corresponding to respective swing joints in a swing leg of the robot associated with the stepping, and determining whether the swing parameters satisfy a preset swing limit requirement; and based on the second center of mass position and the inverse kinematics solution algorithm, determining support parameters corresponding to respective support joints in a support leg of the robot associated with the stepping, and determining whether the support parameters satisfy a preset support limit requirement.

In some embodiments of the present disclosure, determining whether the swing parameters satisfy the preset swing limit requirement includes:

in response to that a first swing parameter corresponding to a first swing joint among the respective swing joints does not satisfy a first swing limit requirement corresponding to the first swing joint, updating the first feedback gain; and turning to performing that determining, based on the expected velocity, the second instantaneous velocity, the first feedforward coefficient and the first feedback gain, the stable foothold position corresponding to the current stepping cycle, until the swing parameters satisfy the preset swing limit requirement.

In some embodiments of the present disclosure, the updating the first feedback gain includes:

determining in a pre-stored feedback gain set a subset of feedback gains smaller than the first feedback gain, and determining a largest feedback gain in the subset of feedback gains as a second feedback gain; and updating the first feedback gain as the second feedback gain.

In some embodiments of the present disclosure, the determining whether the support parameters satisfy the preset support limit requirement includes:

in response to that a first support parameter corresponding to a first support joint among the respective support joints does not satisfy a first support limit requirement corresponding to the first support joint, updating the duration of the current stepping cycle; and turning to performing that determining the remaining duration of the current stepping cycle, until the support parameters satisfy the preset support limit requirement.

In some embodiments of the present disclosure, the updating the duration of the current stepping cycle includes:

determining a subset of stepping cycles whose duration is smaller than the current stepping cycle in a pre-stored stepping cycle set, and determining a stepping cycle with a largest duration in the subset of stepping cycles as a replacement stepping cycle; and updating the current stepping cycle as the replacement stepping cycle.

In some embodiments of the present disclosure, the predicting, based on the remaining duration, the expected velocity of the robot, the first center of mass position and the first instantaneous velocity of the robot at the current moment, and the state space equation, the second center of mass position and the second instantaneous velocity of the robot at the end moment of the current stepping cycle includes:

predicting, based on the remaining duration, the first center of mass position and the first instantaneous velocity of the robot at the current moment, and the state space equation, the second instantaneous velocity of the robot at the end moment of the current stepping cycle; and predicting, based on the expected velocity of the robot, the second instantaneous velocity and the state space equation, the second center of mass position of the robot at the end moment of the current stepping cycle.

In a second aspect, the present disclosure provides an apparatus for controlling robot motion, and the apparatus includes:

a first determination module, configured to determine a remaining duration of a current stepping cycle, where the remaining duration is a duration from a current moment to an end moment of the current stepping cycle;

a prediction module, configured to predict, based on the remaining duration, an expected velocity of a robot, a first center of mass position and a first instantaneous velocity of the robot at the current moment, and a state space equation, a second center of mass position and a second instantaneous velocity of the robot at the end moment;

a second determination module, configured to determine, based on the expected velocity, the second center of mass position and the second instantaneous velocity, a stable foothold position corresponding to the current stepping cycle;

a third determination module, configured to determine, based on the stable foothold position and the second center of mass position, at least one motion parameter corresponding to at least one joint in the robot associated with stepping; and a control module, configured to control the robot based on the at least one motion parameter.

In some embodiments of the present disclosure, the second determination module is configured to:

determine a first feedforward coefficient and a first feedback gain based on a duration of the current stepping cycle; and determine, based on the expected velocity, the second instantaneous velocity, the first feedforward coefficient and the first feedback gain, the stable foothold position corresponding to the current stepping cycle.

In some embodiments of the present disclosure, the third determination module is configured to:

based on the stable foothold position and an inverse kinematics solution algorithm, determine swing parameters corresponding to respective swing joints in a swing leg of the robot associated with the stepping, and determine whether the swing parameters satisfy a preset swing limit requirement; and based on the second center of mass position and the inverse kinematics solution algorithm, determine support parameters corresponding to respective support joints in a support leg of the robot associated with the stepping, and determine whether the support parameters satisfy a preset support limit requirement.

In some embodiments of the present disclosure, the third determination module is configured to:

in response to that a first swing parameter corresponding to a first swing joint among the respective swing joints does not satisfy a first swing limit requirement corresponding to the first swing joint, update the first feedback gain; and turn to performing that determining, based on the expected velocity, the second instantaneous velocity, the first feedforward coefficient and the first feedback gain, the stable foothold position corresponding to the current stepping cycle, until the swing parameters satisfy the preset swing limit requirement.

In some embodiments of the present disclosure, the third determination module is configured to:

determine in a pre-stored feedback gain set a subset of feedback gains smaller than the first feedback gain, and determine a largest feedback gain in the subset of feedback gains as a second feedback gain; and update the first feedback gain as the second feedback gain.

In some embodiments of the present disclosure, the third determination module is configured to:

in response to that a first support parameter corresponding to a first support joint among the respective support joints does not satisfy a first support limit requirement corresponding to the first support joint, update the duration of the current stepping cycle; and turn to performing that determining the remaining duration of the current stepping cycle, until the support parameters satisfy the preset support limit requirement.

In some embodiments of the present disclosure, the third determination module is configured to:

determine in a pre-stored stepping cycle set a subset of stepping cycles whose duration is smaller than the duration of the current stepping cycle, and determine a stepping cycle with a largest duration in the subset of stepping cycles as a replacement stepping cycle; and update the current stepping cycle as the replacement stepping cycle.

In some embodiments of the present disclosure, the prediction module is configured to:

predict, based on the remaining duration, the first center of mass position and the first instantaneous velocity of the robot at the current moment, and the state space equation, the second instantaneous velocity of the robot at the end moment of the current stepping cycle; and predict, based on the expected velocity of the robot, the second instantaneous velocity and the state space equation, the second center of mass position of the robot at the end moment of the current stepping cycle.

In a third aspect, there is provided an electronic device, including a processor and a memory. At least one instruction is stored in the memory, which is loaded and executed by the processor to implement operations performed by the method for controlling the robot motion.

In a fourth aspect, there is provided a computer-readable storage medium. At least one instruction is stored in the storage medium, which is loaded and executed by the processor to implement operations performed by the method for controlling the robot motion.

The beneficial effects brought by the technical solutions provided by embodiments of the present disclosure are:

In the solutions provided by embodiments of the present disclosure, in the process of controlling the robot motion, the second center of mass position and the second instantaneous velocity of the robot may be predicted based on the first center of mass position and the first instantaneous velocity of the robot at the current moment and the state space equation, and then the stable foothold of the robot is determined. By means of the solutions, the center of mass position and the center of mass velocity (i.e., the instantaneous velocity) of the robot are taken into account upon the determination of the stable foothold of the robot. If the center of mass position and the center of mass velocity of the robot change due to the external force during the motion, the robot will determine the stable foothold based on the changed center of mass position and center of mass velocity, so that legs of the robot have balanced force when the legs of the robot reach the stable foothold, preventing the robot from falling, which facilitates to improve the stability of the robot during the motion.

Those of ordinary skill in the art can understand that all or part of the steps of implementing the above embodiments may be completed by hardware, or may be completed by instructing relevant hardware through a program, and the program may be stored in a computer-readable storage medium. The storage medium mentioned may be a read-only memory, a magnetic disk, or an optical disk, etc.

The above-described embodiments are only alternative examples of the present disclosure and do not limit the present disclosure, and any modification, equivalent replacement, improvement, etc. made within the spirit and principle of the present disclosure should be included in the scope of protection of the present disclosure.

What is claimed is:

1. A method for controlling robot motion, comprising:

determining a remaining duration of a current stepping cycle, wherein the remaining duration is a duration from a current moment to an end moment of the current stepping cycle;

predicting, based on the remaining duration, an expected velocity of a robot, a first center of mass position and a first instantaneous velocity of the robot at the current moment, and a state space equation, a second center of mass position and a second instantaneous velocity of the robot at the end moment of the current stepping cycle;

determining, based on the expected velocity, the second center of mass position and the second instantaneous velocity, a stable foothold position corresponding to the current stepping cycle;

determining, based on the stable foothold position and the second center of mass position, at least one motion parameter corresponding to at least one joint in the robot associated with stepping; and controlling the robot based on the at least one motion parameter, wherein determining, based on the expected velocity, the second center of mass position and the second instantaneous velocity, the stable foothold position corresponding to the current stepping cycle comprises:

determining a first feedforward coefficient and a first feedback gain based on a duration of the current stepping cycle; and determining, based on the expected velocity, the second instantaneous velocity, the first feedforward coefficient and the first feedback gain, the stable foothold position corresponding to the current stepping cycle;

wherein determining, based on the stable foothold position and the second center of mass position, the at least one motion parameter corresponding to at least one joint in the robot associated with the stepping comprises:

based on the stable foothold position and an inverse kinematics solution algorithm, determining swing parameters corresponding to respective swing joints in a swing leg of the robot associated with the stepping, and determining whether the swing parameters satisfy a preset swing limit requirement; and based on the second center of mass position and the inverse kinematics solution algorithm, determining support parameters corresponding to respective support joints in a support leg of the robot associated with the stepping, and determining whether the support parameters satisfy a preset support limit requirement;

wherein determining whether the swing parameters satisfy the preset swing limit requirement comprises:

in response to a first swing parameter corresponding to a first swing joint among the respective swing joints not satisfying a first swing limit requirement corresponding to the first swing joint, updating the first feedback gain; and returning to performing that determining, based on the expected velocity, the second instantaneous velocity, the first coefficient and the first feedback gain, the stable foothold position corresponding to the current stepping cycle, until the swing parameters satisfy the preset swing limit requirement; and wherein updating the first feedback gain comprises:

determining, in a pre-stored set of feedback gains, a subset of feedback gains smaller than the first feedback gain, and determining a largest feedback gain in the subset of feedback gains as a second feedback gain; and updating the first feedback gain as the second feedback gain.

2. The method according to claim 1, wherein predicting, based on the remaining duration, the expected velocity of the robot, the first center of mass position and the first instantaneous velocity of the robot at the current moment, and the state space equation, the second center of mass position and the second instantaneous velocity of the robot at the end moment of the current stepping cycle comprises:

predicting, based on the remaining duration, the first center of mass position and the first instantaneous velocity of the robot at the current moment, and the state space equation, the second instantaneous velocity of the robot at the end moment of the current stepping cycle; and predicting, based on the expected velocity of the robot, the second instantaneous velocity and the state space equation, the second center of mass position of the robot at the end moment of the current stepping cycle.

3. A non-transitory computer-readable storage medium, wherein at least one instruction is stored in the storage medium, and the at least one instruction, when loaded and executed by a processor, causes the processor to perform the method according to claim 1.

4. An electronic device, comprising a processor and a memory, wherein at least one instruction is stored in the memory, and the at least one instruction, when loaded and executed by the processor, causes the processor to perform acts comprising:

determining a remaining duration of a current stepping cycle, wherein the remaining duration is a duration from a current moment to an end moment of the current stepping cycle;

predicting, based on the remaining duration, an expected velocity of a robot, a first center of mass position and a first instantaneous velocity of the robot at the current moment, and a state space equation, a second center of mass position and a second instantaneous velocity of the robot at the end moment of the current stepping cycle;

determining, based on the expected velocity, the second center of mass position and the second instantaneous velocity, a stable foothold position corresponding to the current stepping cycle;

determining, based on the stable foothold position and the second center of mass position, at least one motion parameter corresponding to at least one joint in the robot associated with stepping; and controlling the robot based on the at least one motion parameter, wherein determining, based on the expected velocity, the second center of mass position and the second instantaneous velocity, the stable foothold position corresponding to the current stepping cycle comprises:

determining a first feedforward coefficient and a first feedback gain based on a duration of the current stepping cycle; and determining, based on the expected velocity, the second instantaneous velocity, the first feedforward coefficient and the first feedback gain, the stable foothold position corresponding to the current stepping cycle;

wherein determining, based on the stable foothold position and the second center of mass position, the at least one motion parameter corresponding to at least one joint in the robot associated with the stepping comprises:

based on the stable foothold position and an inverse kinematics solution algorithm, determining swing parameters corresponding to respective swing joints in a swing leg of the robot associated with the stepping, and determining whether the swing parameters satisfy a preset swing limit requirement; and based on the second center of mass position and the inverse kinematics solution algorithm, determining support parameters corresponding to respective support joints in a support leg of the robot associated with the stepping, and determining whether the support parameters satisfy a preset support limit requirement;

wherein determining whether the swing parameters satisfy the preset swing limit requirement comprises:

in response to a first swing parameter corresponding to a first swing joint among the respective swing joints not satisfying a first swing limit requirement corresponding to the first swing joint, updating the first feedback gain; and returning to performing that determining, based on the expected velocity, the second instantaneous velocity, the first feedforward coefficient and the first feedback gain, the stable foothold position corresponding to the current stepping cycle, until the swing parameters satisfy the preset swing limit requirement; and wherein updating the first feedback gain comprises:

determining, in a pre-stored set of feedback gains, a subset of feedback gains smaller than the first feedback gain, and determining a largest feedback gain in the subset of feedback gains as a second feedback gain; and updating the first feedback gain as the second feedback gain.

5. The electronic device according to claim 4, wherein the at least one instruction, when loaded and executed by the processor, causes the processor to further perform:

predicting, based on the remaining duration, the first center of mass position and the first instantaneous velocity of the robot at the current moment, and the state space equation, the second instantaneous velocity of the robot at the end moment of the current stepping cycle; and predicting, based on the expected velocity of the robot, the second instantaneous velocity and the state space equation, the second center of mass position of the robot at the end moment of the current stepping cycle.

6. A method for controlling robot motion, comprising:

determining a remaining duration of a current stepping cycle, wherein the remaining duration is a duration from a current moment to an end moment of the current stepping cycle;

predicting, based on the remaining duration, an expected velocity of a robot, a first center of mass position and a first instantaneous velocity of the robot at the current moment, and a state space equation, a second center of mass position and a second instantaneous velocity of the robot at the end moment of the current stepping cycle;

determining, based on the expected velocity, the second center of mass position and the second instantaneous velocity, a stable foothold position corresponding to the current stepping cycle;

determining, based on the stable foothold position and the second center of mass position, at least one motion parameter corresponding to at least one joint in the robot associated with stepping; and controlling the robot based on the at least one motion parameter, wherein determining, based on the expected velocity, the second center of mass position and the second instantaneous velocity, the stable foothold position corresponding to the current stepping cycle comprises:

determining a first feedforward coefficient and a first feedback gain based on a duration of the current stepping cycle; and determining, based on the expected velocity, the second instantaneous velocity, the first feedforward coefficient and the first feedback gain, the stable foothold position corresponding to the current stepping cycle;

wherein determining, based on the stable foothold position and the second center of mass position, the at least one motion parameter corresponding to at least one joint in the robot associated with the stepping comprises:

based on the stable foothold position and an inverse kinematics solution algorithm, determining swing parameters corresponding to respective swing joints in a swing leg of the robot associated with the stepping, and determining whether the swing parameters satisfy a preset swing limit requirement; and based on the second center of mass position and the inverse kinematics solution algorithm, determining support parameters corresponding to respective support joints in a support leg of the robot associated with the stepping, and determining whether the support parameters satisfy a preset support limit requirement;

wherein determining whether the support parameters satisfy the preset support limit requirement comprises:

in response to a first support parameter corresponding to a first support joint among the respective support joints not satisfying a first support limit requirement corresponding to the first support joint, updating the duration of the current stepping cycle; and returning to performing that determining the remaining duration of the current stepping cycle, until the support parameters satisfy the preset support limit requirement; and wherein updating the duration of the current stepping cycle comprises:

determining, in a pre-stored set of stepping cycles, a subset of stepping cycles whose duration is shorter than the duration of the current stepping cycle, and determining a stepping cycle with a longest duration in the subset of stepping cycles as a replacement stepping cycle; and updating the current stepping cycle as the replacement stepping cycle.

7. An electronic device, comprising a processor and a memory, wherein at least one instruction is stored in the memory, and the at least one instruction, when loaded and executed by the processor, causes the processor to perform the method according to claim 6.

8. A non-transitory computer-readable storage medium, wherein at least one instruction is stored in the storage medium, and the at least one instruction, when loaded and executed by a processor, causes the processor to perform the method according to claim 6.

* * * * *